US010334796B2

(12) United States Patent
Speidell et al.

(10) Patent No.: US 10,334,796 B2
(45) Date of Patent: Jul. 2, 2019

(54) METHODS AND SYSTEMS OF CULTIVATION

(71) Applicant: MJ Brain Bank, LLC, Denver, CO (US)

(72) Inventors: Eric Speidell, Denver, CO (US); Kyle Speidell, Denver, CO (US)

(73) Assignee: MJ Brain Bank, LLC, Denver, CO (US)

( * ) Notice: Subject to any disclaimer, the term of this patent is extended or adjusted under 35 U.S.C. 154(b) by 327 days.

(21) Appl. No.: 15/157,664

(22) Filed: May 18, 2016

(65) Prior Publication Data

US 2016/0338276 A1 Nov. 24, 2016

Related U.S. Application Data

(60) Provisional application No. 62/163,526, filed on May 19, 2015.

(51) Int. Cl.
*A01G 31/00* (2018.01)
*A01G 31/06* (2006.01)

(52) U.S. Cl.
CPC ........ *A01G 31/06* (2013.01); *A01G 2031/006* (2013.01); *Y02P 60/216* (2015.11)

(58) Field of Classification Search
None
See application file for complete search history.

(56) References Cited

U.S. PATENT DOCUMENTS

| 8,910,419 | B1 * | 12/2014 | Oberst | A01G 31/06 47/60 |
| 2012/0060416 | A1 * | 3/2012 | Brusatore | A01G 31/06 47/62 A |
| 2013/0188389 | A1 * | 7/2013 | Overturf | G02B 6/0008 362/583 |
| 2014/0250778 | A1 * | 9/2014 | Suntych | A01G 7/045 47/1.4 |
| 2014/0283452 | A1 * | 9/2014 | Dittman | A01G 31/06 47/62 R |
| 2016/0324089 | A1 * | 11/2016 | Miyabe | A01C 21/005 |
| 2018/0116131 | A1 * | 5/2018 | Leo | A01G 22/00 |
| 2018/0132441 | A1 * | 5/2018 | Harker | A01G 31/042 |

* cited by examiner

*Primary Examiner* — Trinh T Nguyen
(74) *Attorney, Agent, or Firm* — Kilpatrick Townsend & Stockton LLP

(57) ABSTRACT

Examples may include a method of cultivating cannabis plants. The method may include placing a first cannabis plant of a plurality of cannabis plants in a first tray of a plurality of trays. The method may also include placing a second cannabis plant of the plurality of cannabis plants in a second tray of the plurality of trays. The first tray may be at a first height. The second tray may be at a second height, and the first height may be different the second height. Furthermore, the method may include flowing a nutrient mixture from a reservoir to the plurality of cannabis plants. In addition, the method may include returning a portion of the nutrient mixture to the reservoir after flowing the nutrient mixture from the reservoir to the plurality of cannabis plants.

1 Claim, 9 Drawing Sheets

METHODS AND SYSTEMS OF CULTIVATION

CROSS-REFERENCES TO RELATED APPLICATIONS

This application is a non-provisional of and claims the benefit of priority to U.S. Provisional Application No. 62/163,526, filed May 19, 2015, the entire contents of which is incorporated herein by reference.

BACKGROUND

Marijuana is a drug used medicinally and recreationally. Recent legislation at state levels to regulate marijuana has spurned an industry around the production and sale of both medicinal and recreational marijuana. Marijuana contains tetrahydrocannabinol (THC), cannabidiol (CBD), and many other compounds responsible for its psychoactive and medicinal properties. THC is believed to be responsible for a psychoactive effect, while CBD is believed to be responsible for marijuana's medical properties without the potential psychotropic effects of THC. These compounds and marijuana itself are produced from *cannabis* plants. As the industry grows under state regulatory regimes, the industry demands more and more the production of *cannabis* plants with increased output and consistent high quality. Methods used to cultivate *cannabis* plants for the black market may not meet the demands for quality and output of *cannabis* in a regulated market. *Cannabis* plants that produce consistent or suitable levels of THC, CBD, and other compounds are desired. Producing consistent quality *cannabis* plants cost effectively and efficiently is also a goal. Moreover, production and harvesting of the *cannabis* plants should occur under safe conditions for workers. These and other needs are addressed.

BRIEF SUMMARY

The methods and systems of cultivating *cannabis* plants may provide cost effective, scalable production of marijuana. *Cannabis* plants can be grown indoors, permitting for efficient control of lighting and of climate. The methods and systems allow for growing *cannabis* plants in vertical stacks on multiple vertical shelves, increasing the density of *cannabis* plants that can be grown per square foot. The higher density of *cannabis* plants increases cost efficiency directly by yielding more *cannabis* plants per square foot and per watt of input power. In addition, the higher density of *cannabis* plants per square foot may also facilitate easier and more consistent control of temperature and air quality with a building's heating, ventilating, and air conditioning (HVAC) system. In methods and systems described herein, nutrients may be recycled, saving on materials and operational costs. Separate and dedicated areas for vegetative growth and flowering growth may increase throughput.

Examples may include a method of cultivating *cannabis* plants. The method may include placing a first *cannabis* plant of a plurality of *cannabis* plants in a first tray of a plurality of trays. The method may also include placing a second *cannabis* plant of the plurality of *cannabis* plants in a second tray of the plurality of trays. The first tray may be at a first height. The second tray may be at a second height, and the first height may be different than the second height. Furthermore, the method may include flowing a nutrient mixture from a reservoir to the plurality of *cannabis* plants. In addition, the method may include returning a portion of the nutrient mixture to the reservoir after flowing the nutrient mixture from the reservoir to the plurality of *cannabis* plants.

These or other examples may include a system for cultivating *cannabis* hydroponically. The system may include a first tray of a plurality of trays disposed at the first height. Similarly, the system may include a second tray of the plurality of trays disposed at a second height. The first height may be different from the second height. The system may also include a first nutrient mixture reservoir. The system may further include a pump coupled to the first nutrient mixture reservoir and each tray of the plurality of trays. The pump may be configured to deliver a first nutrient mixture to each tray of the plurality of trays.

Examples may include a method of cultivating *cannabis* hydroponically. The method may include placing a first *cannabis* plant of a plurality of *cannabis* plants in a first tray of a plurality of trays. The method may also include placing a second *cannabis* plant of the plurality of *cannabis* plants in a second tray of the plurality of trays. The first tray may be disposed on a first shelf of a first rack system, and the second tray may be disposed on a second shelf of the first rack system. The first shelf may be at a first height, and the second shelf may be at a second height. The first height may not be equal to the second height. Furthermore, the method may include flowing a first nutrient mixture from a first nutrient reservoir to the plurality of *cannabis* plants. In addition, the method may include returning a portion of the first nutrient mixture to the first nutrient reservoir after flowing the first nutrient mixture to the plurality of *cannabis* plants. The method may further include exposing the plurality of *cannabis* plants to a first artificial light source having a first limited spectrum. The method may also include growing on the first rack system each *cannabis* plant of the plurality of *cannabis* plants without producing flowers. Additionally, the method may include transporting the plurality of trays from the first rack system to a second rack system. The method may then include flowing a second nutrient mixture from the second nutrient reservoir to the plurality of *cannabis* plants. Also, the method may include exposing the plurality of *cannabis* plants to a second artificial light source having a second limited spectrum, where the first limited spectrum includes a different wavelength range than the second limited spectrum. Furthermore, the method may include growing flowers on each cannabis plant of the plurality of *cannabis* plants on the second rack system.

DETAILED DESCRIPTION

Conventional methods of growing *cannabis* plants may not be scalable to meet the increased demands of the industry. Conventional methods may require a large amount of area for each *cannabis* plant grown. This large amount of area needed may present operational difficulties and costs. A large area is less cost effective for several reasons, including the cost of the land or the building associated with the area. With conventional methods, increasing the production of *cannabis* plants may result in an increase in the square footage needed. Another reason for increased costs is the difficulty in controlling the temperature and climate of a large area, and thus large volume, of space. Conventional methods may include supplying nutrients in an inefficient or non-automated manner. Nutrients and water may not be recycled, increasing costs of the materials, treatment, or disposal. These conventional methods may also not allow for a consistent application of nutrients, water, or light in order to produce a consistent, high quality product. Conventional methods may not have separate areas for vegetative and flowering growth, making tailoring growing conditions to each growth phase more difficult or less consistent. Conventional methods may not allow for year-round production of *cannabis* in areas where the climate may not be hospitable year-round. In addition, conventional methods may not be energy efficient, with inefficient fluid handling systems. And while conventional methods may produce *cannabis* plants with an acceptable and perhaps desirable smell and taste, the quality of the *cannabis* plant, including its THC and CBD concentrations, may not be accurately judged by qualitative measures such as smell and taste. Moreover, the smell and taste of a *cannabis* plant may not be sufficient to pass regulatory standards. Methods and systems described herein provide advantages over conventional methods.

Figure 1:
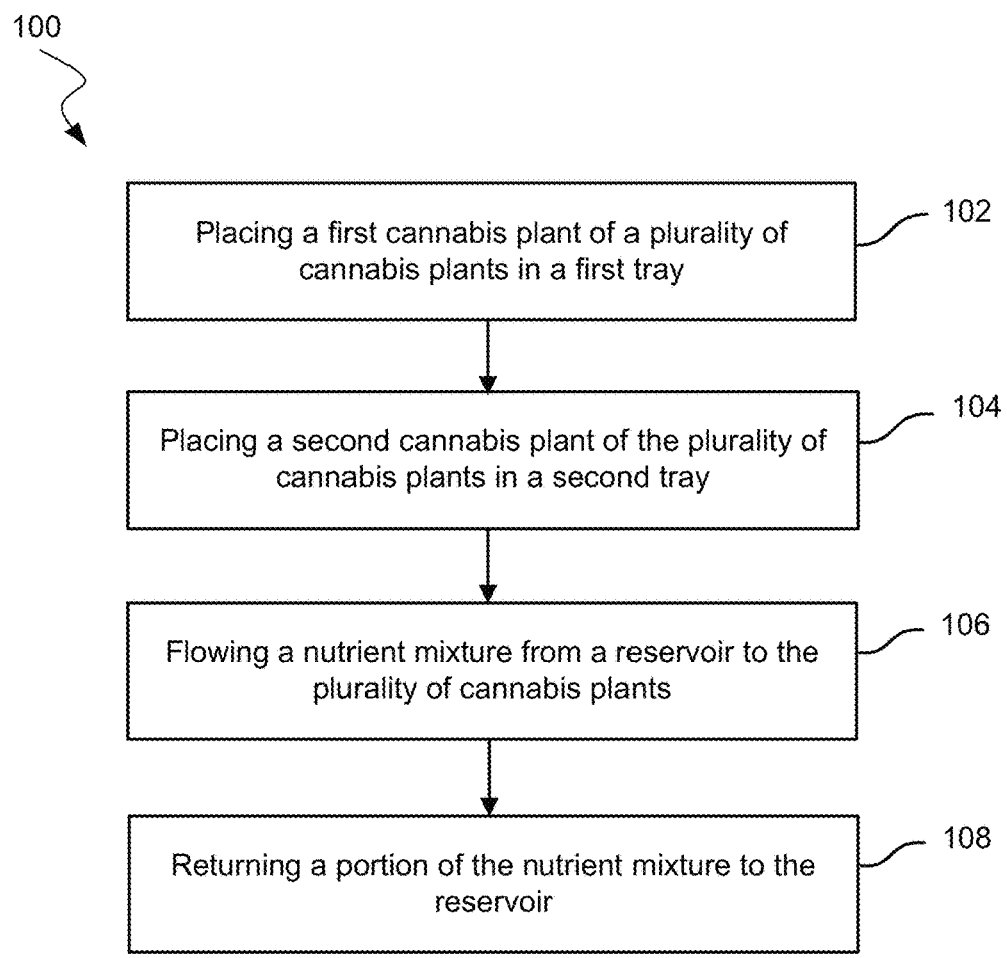
FIG. 1 is a block diagram of an example method of cultivating plants according to embodiments.

Examples may include a method of cultivating *cannabis* plants. FIG. 1 shows an example method 100 of cultivating *cannabis* plants. These methods and systems described herein may apply to plants other than *cannabis* plants. Nonetheless, plants other than *cannabis* plants may have different growth characteristics, economic factors, or other properties from *cannabis* plants that may make these methods not suitable for plants other than *cannabis* plants. For example, plants other than *cannabis* may not have enough economic value to use the methods described herein. Plants other than *cannabis* may have a shorter life cycle or may not need a flowering growth period before harvesting for sale. Also, plants may not have a growth cycle dependent on specific wavelength ranges of light during certain growth phases. Additionally, some plants may not have the appropriate structure to grow in the methods and systems described herein. Some plants, other than *cannabis* plants, may not have the rigidity to grow upright.

Cultivation of the *cannabis* plants may occur indoors and/or hydroponically. The *cannabis* plants may be cultivated in a building where the plants have limited or no exposure to natural light, which may allow for more precise control of light exposure. The plants may not be in a greenhouse. *Cannabis* plants may include *Cannabis sativa*, *Cannabis indica*, a hybrid of *Cannabis sativa* and *Cannabis indica*, or mixtures thereof.

Method 100 may include placing a first *cannabis* plant of a plurality of *cannabis* plants in a first tray of a plurality of trays 102. Similarly, method 100 may also include placing a second *cannabis* plant of the plurality of *cannabis* plants in a second tray of the plurality of trays 104. The *cannabis* plants may be clones of a plant. The first tray may be at a first height. The second tray may be at a second height, and the first height may be different the second height. The trays may be plastic, aluminum, or other lightweight and water-impermeable material. *Cannabis* plants may be supported by trellises in the trays.

The first tray may be on a first shelf of a rack system, and the second tray may be on a second shelf of the rack system. The methods may be extended to more than two shelves and more than two trays. For example, the method may include up to 3, up to 5, or up to 7 shelves, with each shelf at a different height. Each shelf may hold a subset of the plurality of trays, with one or more trays adjacent to one or more other trays. The rack system may be steel, stainless steel, or other similar material.

On the rack system, the plurality of *cannabis* plants may undergo vegetative growth. The plants may grow vertically and may grow leaves without growing flowers. Pesticide and/or fungicide may be applied to the plants. Light sources for *cannabis* plants may be turned off during or immediately after application of the pesticide/fungicide. The plurality of *cannabis* plants may spend one or two months on the rack system in the vegetative growth stage. The temperature and humidity during vegetative growth may be maintained substantially constant. For example, the temperature may be between about 70° F. and about 80° F., between about 70° F. and about 75° F., between about 75° F. and about 80° F., or about 78° F. in embodiments. Humidity may be between about 50% and about 70%, between about 50% and about 60%, between about 60% and about 65%, or about 60% in embodiments. All *cannabis* plants in the vegetative growth stage may be in one room.

Furthermore, method 100 may include flowing a nutrient mixture from a reservoir to the plurality of *cannabis* plants 106. The nutrient mixture may include a solution of nutrients in water. Water may be treated by a reverse osmosis system and maintained at a constant temperature before being supplied to the trays. The flowrate of the nutrient mixture may be as high as 4,300 GPH @ 1 foot of head or 1,500 GPH at 30 feet of head. A pump may be used to flow the nutrient mixture from the reservoir. The reservoir may be aerated, which may prevent the nutrient mixture from precipitating and may aid in maintaining the reservoir at a temperature near or at the ambient temperature. Method 100 may also include adding a growing medium to each tray of the plurality of trays. The growing medium may be clay pellets or any commercially available growing medium. The growing medium may exclude soil.

In some embodiments, the *cannabis* plants may be stabilized in the tray by a granular material, such as the clay pellets. The granular material may be porous and substantially spherical. The mean or median diameter of the granular material may be in a range from 0.5 cm to 1.0 cm, 1.0 cm to 1.5 cm, 1.5 cm to 2.0 cm, 2.0 cm to 2.5 cm, or 2.5 cm or higher in embodiments. The clay pellets may be reused after being washed and sanitized. The *cannabis* plants may not use trellises when supported by the granular material. For example, plants in vegetative growth phase may not be large enough to need extra support provided by a trellis.

Each *cannabis* plant may be placed in a substantially cylindrical container, such as a nursery pot. Granular material may be placed in the cylindrical container along with the *cannabis* plant. The cylindrical container may include apertures or openings that allow liquids to flow in and out of the container. The apertures may be vertical slits. The cylindrical container with one *cannabis* plant or a plurality of *cannabis* plants may be individually moved into or out of a tray. Each cylindrical container may be individually tracked as the *cannabis* plant proceeds through the process.

In addition, method 100 may include returning a portion of the nutrient mixture to the reservoir 108 after flowing the nutrient mixture from the reservoir to the plurality of *cannabis* plants. Returning the portion of the nutrient mixture may include using gravity not a pump to flow the portion of the nutrient mixture back to the reservoir. The portion of the nutrient mixture may be recycled by flowing the portion of the nutrient mixture back to the plurality of *cannabis* plants. The nutrient mixture may be recirculated for up to 1 day, 2 days, 4 days, 6 days, 7 days, 10 days, or 14 days. At the end of the recirculation period, the nutrient mixture may be replaced or replenished. The nutrient mixture may be drained by the same pumps that are used to recirculate the nutrient mixture. Draining may use conduits from trays and reservoirs different the nutrient mixture lines used to recirculate the nutrient mixture. Draining may not use a trench drain or a drain in the floor of the building. The reservoir and pumps may be cleaned with hydrogen peroxide or boiling water as part of the replacement of the nutrient mixture.

In these or other examples, methods may include exposing the plurality of *cannabis* plants to an artificial, limited spectrum light source. The artificial, limited spectrum light source may be an induction lamp. The first limited spectrum for vegetative growth may include blue wavelengths at about 6,500 K. The light source for vegetative growth may be a light induction technology. The artificial, limited spectrum light source may exclude light emitting diodes.

Methods may include transporting the plurality of trays onto a rack system. The light sources may be fixed while the trays may be movable. In other words, the distance between the light and the plant may be adjusted by moving the tray rather than the light source. A tray may sit on a pallet or a structure that sits on a shelf. Multiple pallets or structures may be used to adjust the tray closer to the light source. The pallet or structure may be made of wood. The rack system may be a second rack system, a different rack system from the rack system with the first shelf and a second shelf.

Transporting the trays onto the rack system may include using a forklift to remove trays from and place trays on a shelf. Forklifts may also be used to allow inspection and data collection of the *cannabis* plants. A forklift may also be called an order picker lift. The forklift may be configured with a platform on the forks of the forklift. The platform may support the weight and dimensions of multiple trays. The platform may also further support a person who may move trays to and from shelves. The forklift may include a safety harness for the person. The spacing between adjacent rack systems may be about the same as the width of the forklift. In this manner, the forklift can be used to access shelves on adjacent rack systems at the same time. Two adjacent rack systems in the same growth phase may be separated by 3 feet to 4 feet, or 4 feet to 5 feet.

Transporting the trays could also be by an automated system. Methods may include growing flowers on the plurality of *cannabis* plants on the second rack system. The *cannabis* plants may undergo flowering growth on the second rack system. *Cannabis* plants may be supported by a trellis during flowering growth. The trellis may be a lattice of filaments. The filaments may be threads made of natural or synthetic fibers. In some embodiments, the threads may be interconnecting plastic lines. The trellis may be connected directly to the framing of rack system.

During flowering growth, the *cannabis* plants may be supplied a nutrient mixture solution or a flush solution. A flush solution may be used to balance out the plants' intake of nutrients and prevent the nutrient levels from becoming toxic. The plurality of *cannabis* plants may be exposed to a second limited spectrum when on the second rack system. The second limited spectrum light source may be a light emitting ceramic (LEC) technology. LEC may be ceramic high intensity discharge (HID) lighting, which may be more energy efficient than metal halide or high pressure sodium lamps. The second limited spectrum may include red wavelengths at about 2,700 K. The flowering growth phase may take one or two months. The temperature and humidity during flowering may be maintained substantially constant. For example, the temperature may be between about 70° F. and about 80° F., between about 70° F. and about 75° F., between about 75° F. and about 80° F., or about 78° F. in embodiments. Humidity may be between about 30% and about 50%, between about 30% and about 40%, between about 40% and about 50%, or about 40% in embodiments. Temperature, humidity, and concentration may be maintained constant or near constant by fans, blowers, or other air handling systems. All *cannabis* plants in the flowering growth stage may be in one room. One room may be used for all *cannabis* plants in either vegetative growth or flowering growth. In some embodiments, a movable vertical partition may separate *cannabis* plants in vegetative growth from those in flowering growth. After the flowering stage is complete, the *cannabis* plants may be trimmed and harvested.

Figure 2:
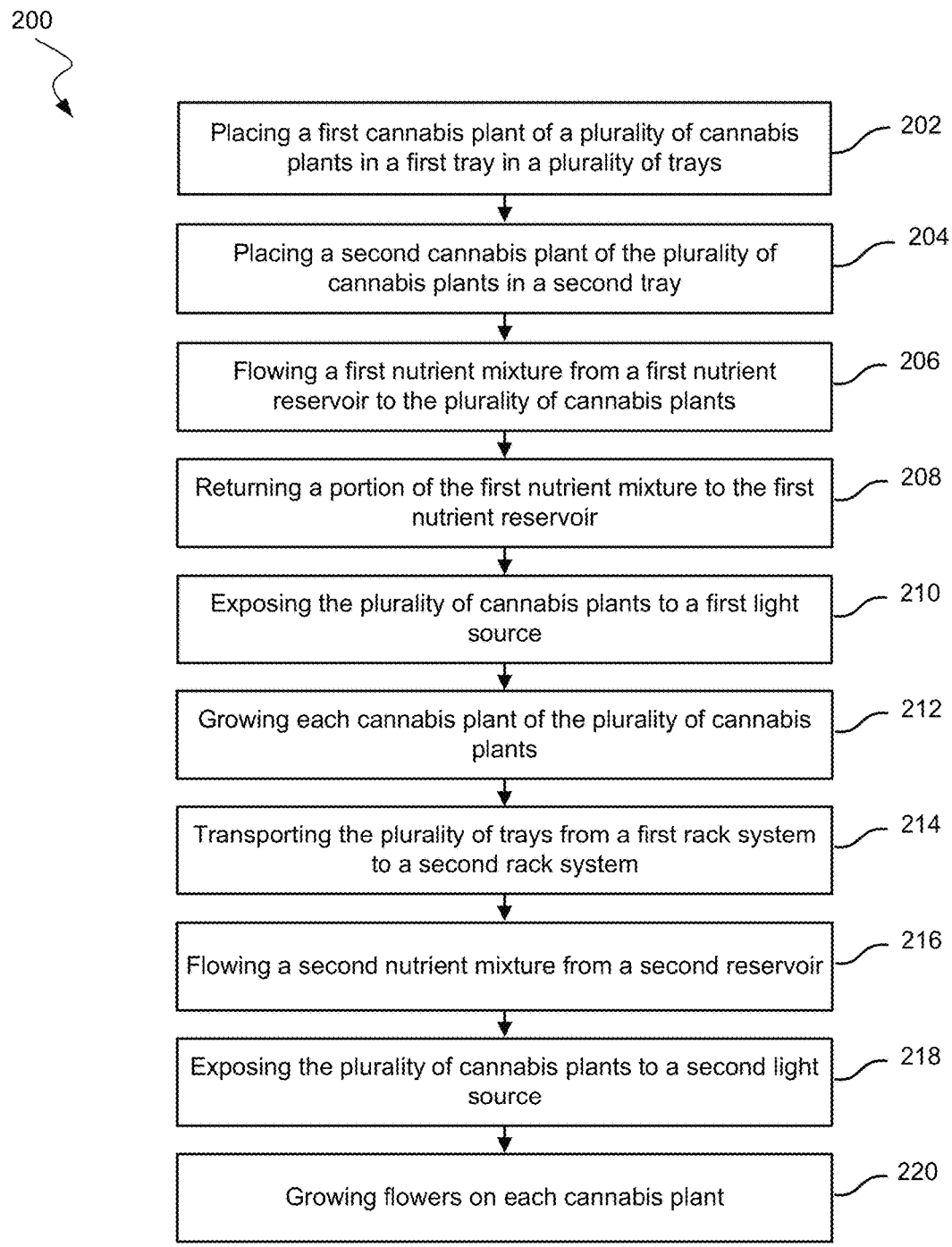
FIG. 2 is a block diagram of an example method of cultivating *cannabis* hydroponically according to embodiments.

Examples may include a method of cultivating *cannabis* hydroponically. FIG. 2 shows an example method 200. Method 200 may include placing a first *cannabis* plant of a plurality of *cannabis* plants in a first tray of a plurality of trays 202. Method 200 may also include placing a second *cannabis* plant of the plurality of *cannabis* plants in a second tray of the plurality of trays 204. The first tray may be disposed on a first shelf of a first rack system, and the second tray may be disposed on a second shelf of the first rack system. The first shelf may be at a first height, and the second shelf may be at a second height. The first height may not be equal to the second height. Furthermore, method 200 may include flowing a first nutrient mixture from a first nutrient reservoir to the plurality of *cannabis* plants 206. In addition, method 200 may include returning a portion of the first nutrient mixture to the first nutrient reservoir 208 after flowing the first nutrient mixture to the plurality of *cannabis* plants. Method 200 may further include exposing the plurality of *cannabis* plants to a first artificial light source 210 having a first limited spectrum. Method 200 may also include growing on the first rack system each *cannabis* plant of the plurality of *cannabis* plants without producing flowers 212. Additionally, method 200 may include transporting the plurality of trays from the first rack system to a second rack system 214. Method 200 may then include flowing a second nutrient mixture from the second nutrient reservoir to the plurality of *cannabis* plants 216. Also, method 200 may include exposing the plurality of *cannabis* plants to a second artificial light source having a second limited spectrum 218, where the first limited spectrum includes a different wavelength range than the second limited spectrum. Furthermore, method 200 may include growing flowers on each *cannabis* plant 220 of the plurality of *cannabis* plants on the second rack system. Method 200 may include any of the method or systems described herein.

Figure 3A:
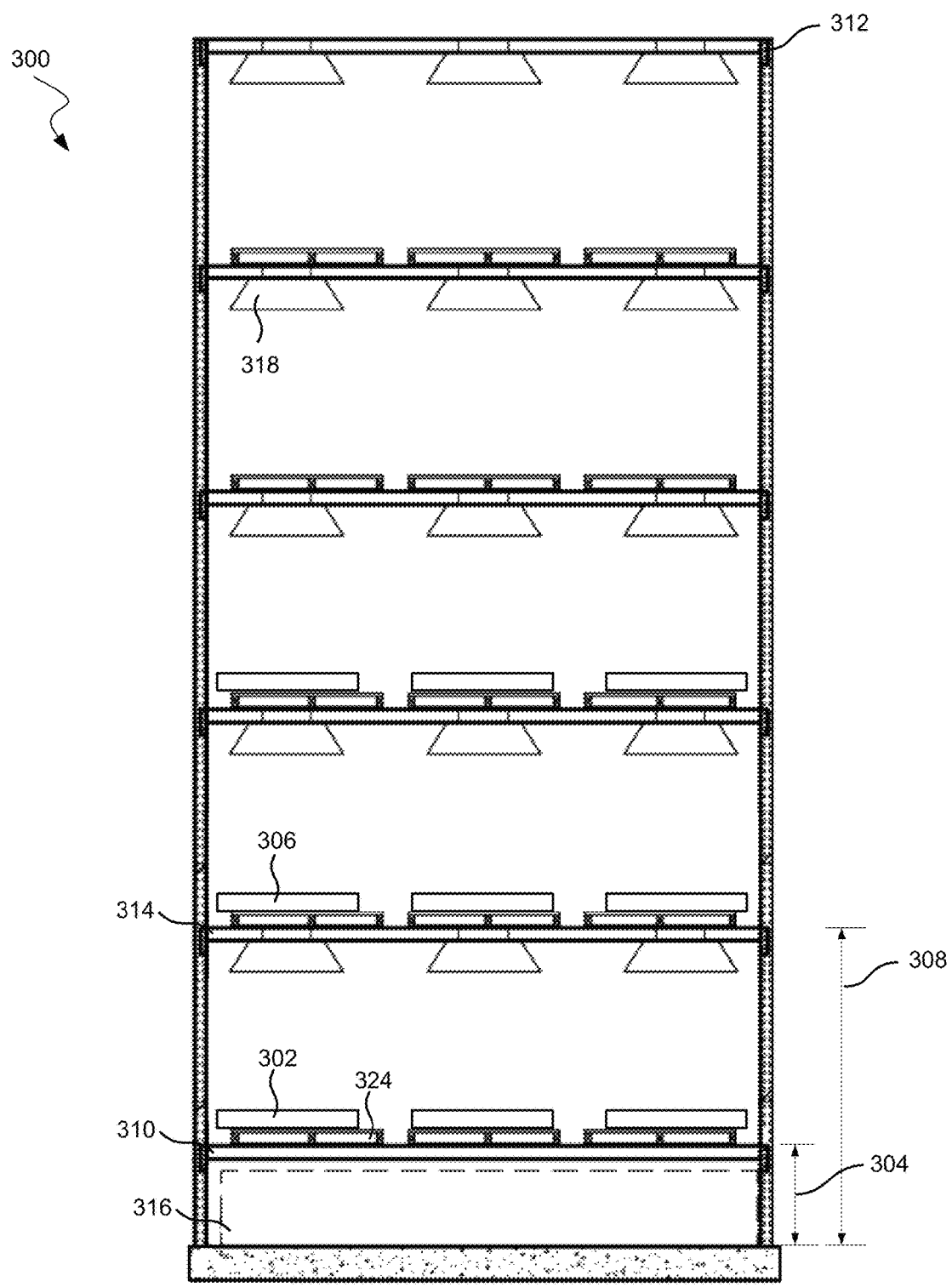
FIGS. 3A, 3B, and 3C show different views of an example rack system according to embodiments.
Figure 3B:
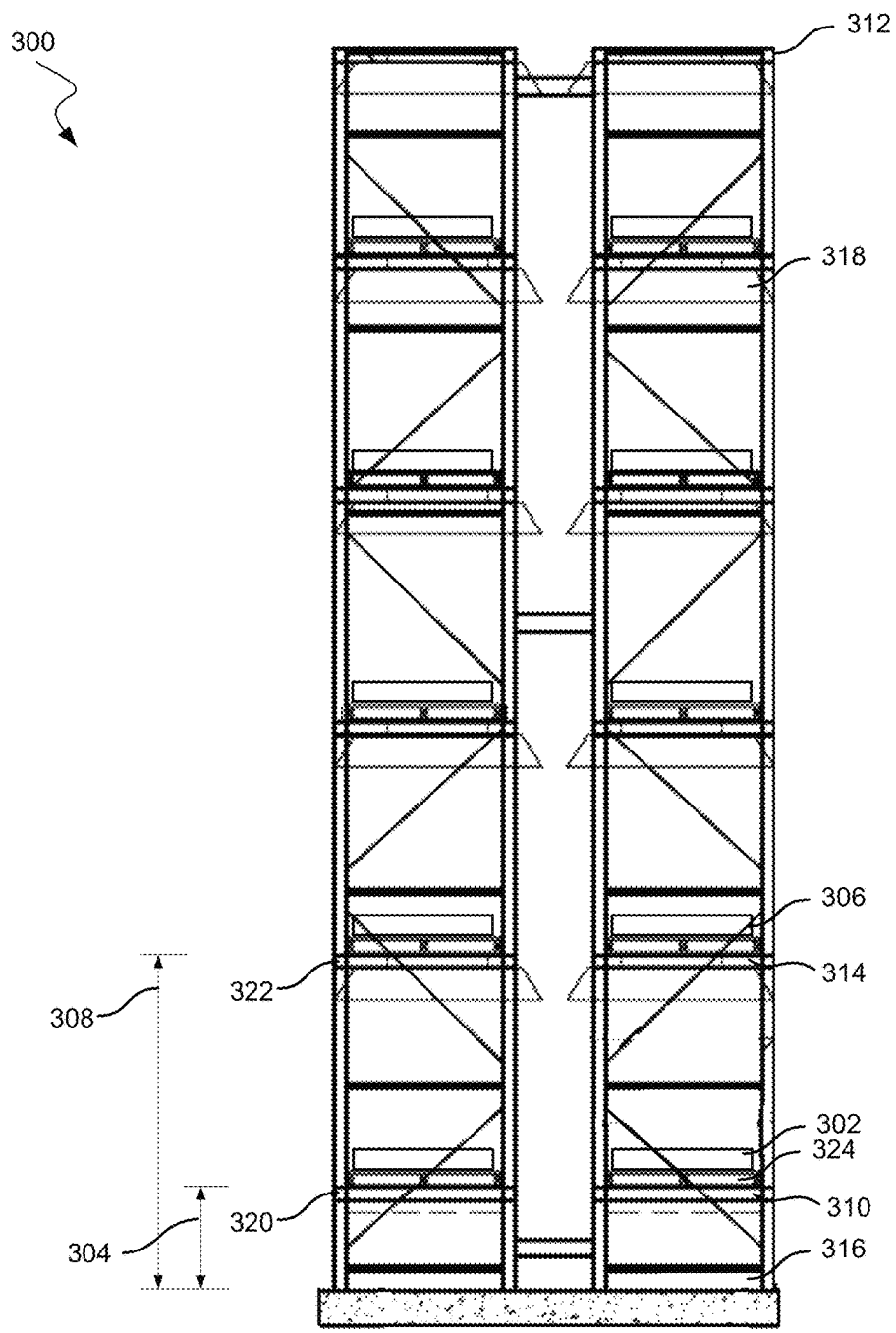
Figure 3C:
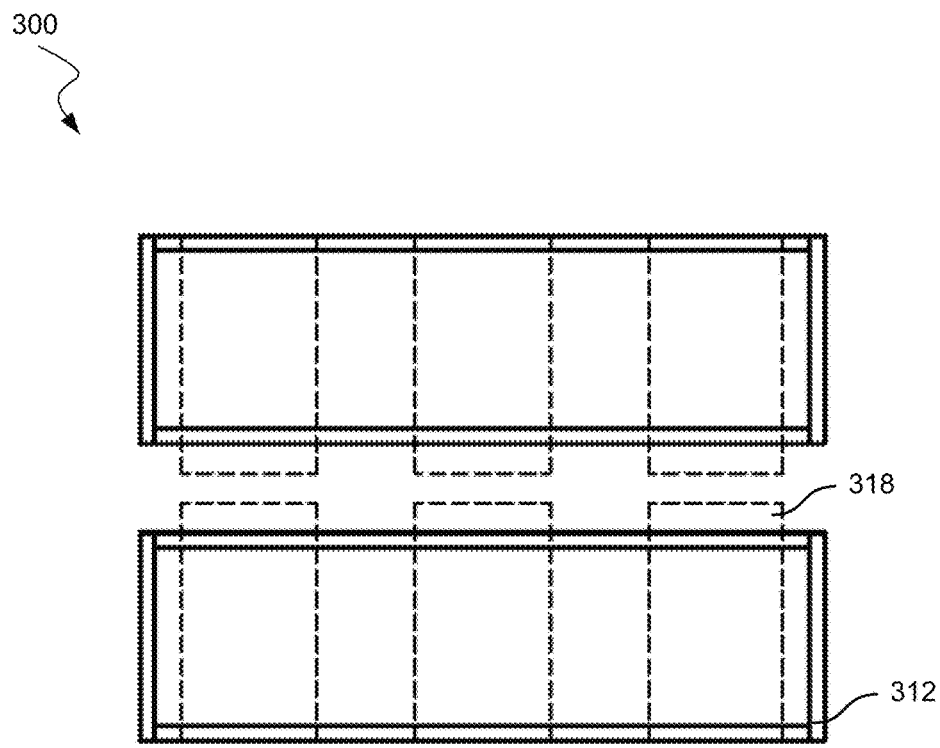

The methods described herein may include using a system for cultivating *cannabis* plants. These or other examples may include a system for cultivating *cannabis* hydroponically. FIGS. 3A, 3B, and 3C show different views of an example system 300. FIG. 3A shows a front view of system 300. FIG. 3B shows a side view of system 300. FIG. 3C shows a top view of system 300.

System 300 may include a first tray 302 of a plurality of trays disposed at a first height 304. Similarly, the system may include a second tray 306 of the plurality of trays disposed at a second height. First height 304 may be different from second height 308. First height 304 may be between about 20 inches and 30 inches, between about 20 inches and about 25 inches, or between about 25 inches and about 30 inches. First tray 302 may be on the first shelf 310 of a rack system 312, and second tray 306 may be on a second shelf 314 of rack system 312. First shelf 310 may be separated from second shelf 314 by between about between about 40 inches and about 50 inches, between about 50 inches and 60 inches, between about 60 inches and 65 inches, between about 65 inches and about 70 inches, or between about 70 inches and 80 inches. A plurality of shelves may be included, where the spaces between any two adjacent shelves are equal. The separation between the first shelf 310 and the second shelf 314 may be a multiple of any of the ranges described, including a multiple of 2, 3, 4, 5, or 6. The height of the higher shelf from the ground may be in a range from 5 feet to 10 feet, 15 feet to 20 feet, 20 feet to 25 feet, 30 feet to 35 feet, 35 feet to 40 feet, 40 feet to 45 feet, or 45 feet to 50 feet.

First tray 302 may be parallel to second tray 306, and first shelf 310 may be vertically aligned to second shelf 314. First tray 302 may be vertically aligned to the second tray 306. In some embodiments, first tray 302 may completely overlap, shadow, or coincide with second tray 306 at a different height. In other embodiments, the first tray may be staggered from the second tray. The subset of the plurality of trays on first shelf 310 may be aligned or in phase with the subset of the plurality of trays on second shelf 314, or the subset of the trays on first shelf 310 may be staggered or out of phase with the subset of the plurality of trays on second shelf 314. A tray may be between about 25 inches and about 45 inches long, between about 30 inches and about 40 inches long, between about 33 inches and about 37 inches long, or 36 inches long. A tray may be between about 25 inches and about 45 inches wide, between about 30 inches and about 40 inches wide, between about 33 inches and about 37 inches wide, or 36 inches wide. A tray may have its length equal its width. A tray may be between 5 inches and 10 inches deep, between 10 inches and 12 inches deep, between 12 inches and 18 inches deep, or 7 inches deep. Each tray may have the same or substantially the same dimensions. A tray may be spaced from an adjacent tray by between about 2 inches and about 24 inches, between about 4 inches and about 12 inches, or between about 3 inches and about 10 inches. Tray 302 may be on top of a pallet 324. A tray may be centered on a pallet or may be centered under a lamp.

A shelf may be between about 40 inches and about 50 inches deep and between about 125 inches and about 135 inches wide. A shelf may be between about 1 inch and about 6 inches thick. A shelf may have dimensions configured to hold a tray or a subset of the plurality of trays. Each shelf may have substantially the same dimensions. Each shelf may support trays on a grating or a metal lattice. The openings in the grating allow for nutrient mixture lines or other conduits to pass through the shelf to the nutrient mixture reservoir or to other shelves.

System 300 may also include a first nutrient mixture reservoir 316. First shelf 310 of rack system 312 may be between about 1 inch and about 6 inches from the first nutrient mixture reservoir 316. The first nutrient mixture reservoir may be on the ground. A reservoir may be filled with liquid and as a result, may be heavy. Placing the reservoir on the ground may avoid moving a heavy item vertically or having to reinforce shelves to hold the weight. System 300 may further include a pump coupled to first nutrient mixture reservoir 316. The pump may be configured to deliver a first nutrient mixture to each tray of the plurality of trays. The pump may flow approximately an equal amount of the first nutrient mixture to each tray. A single pump may deliver the first nutrient mixture to all trays in a vertical plane above the first nutrient mixture reservoir. A tray may have an inlet and/or an outlet for the flow of nutrient mixture. The inlet may also serve as the outlet for the flow. An additional outlet may be included as an overflow for the nutrient mixture, allowing for nutrient mixture above a certain level in the tray to flow down the outlet by gravity and without the use of a pump.

Tray 306 may hold as few as 5 *cannabis* plants and as many as 40 *cannabis* plants. In some embodiments, tray 306 may hold from 5 to 10 *cannabis* plants, from 10 to 15 *cannabis* plants, from 15 to 20 *cannabis* plants, from 20 to 30 *cannabis* plants, or from 30 to 40 *cannabis* plants. Rack system 312 may hold up to 10 trays, up to 20 trays, up to 30 trays, up to 40 trays, or up to 50 trays in examples. Because the trays and the plants may be stacked vertically, system 300 may have over 10 plants per square foot, 20 plants per square foot, or 30 plants per square foot of floor space according to embodiments. The height of rack system 312 may be limited by the power of the pump to pump the nutrient mixture up the height.

In these or other examples, system 300 may include a plurality of lights or induction lamps. An induction lamp 318 of the plurality of induction lamps may be above each tray of the plurality of trays. Induction lamp 318 may be above two trays of a plurality of trays. An induction lamp or light may be between about 20 inches and about 30 inches wide, between about 25 inches and about 35 inches wide, or between about 25 inches and about 30 inches wide. An induction lamp or light may be between about 40 inches and about 50 inches deep, between about 45 inches and about 55 inches deep, or between about 45 inches and about 50 inches deep. Induction lamps may be used for vegetative growth stage.

As shown in the side view in FIG. 3B, system 300 may include a third shelf 320 at first height 304 and a fourth shelf 322 at second height 308. In this manner, trays on these shelves may also be accessible. The depth of the shelves may allow for water to reach lower levels from high levels.

Figure 4A:
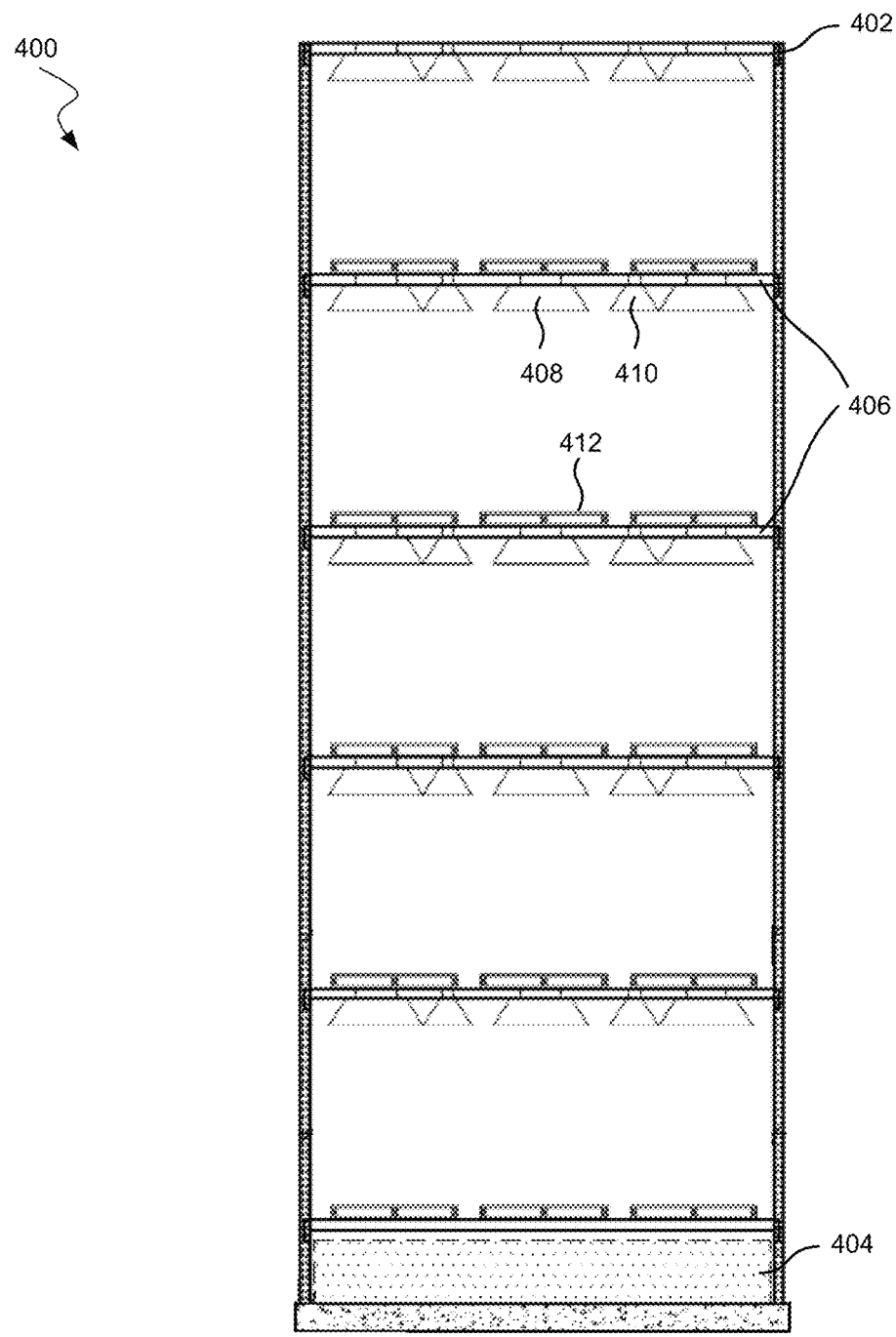
FIGS. 4A and 4B show views of an example rack system according to embodiments.
Figure 4B:
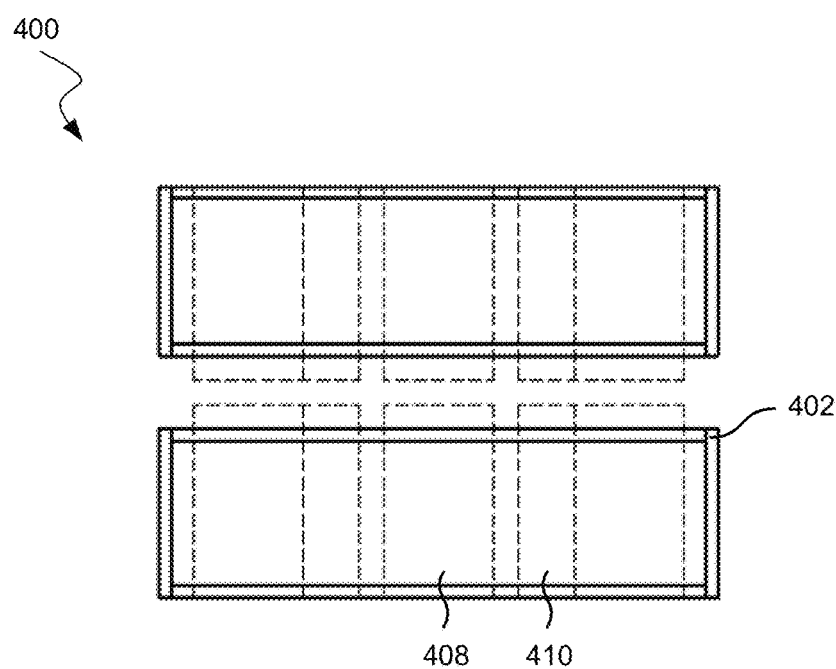

The system may further include a first rack system and a second rack system having a plurality of shelves. The second rack system may be similar to system 312 or, as depicted by the rack system 402 of system 400 in FIGS. 4A and 4B. FIG. 4A shows a front view, and FIG. 4B shows a top view. System 300 as described above may include both the rack system 312 shown in FIGS. 3A-3C and the rack system 402 as shown in FIGS. 4A and 4B. In some embodiments, system 300 may include a second rack system with fewer shelves than the first rack system. For example, the second rack system may have 1, 2, or 3 fewer shelves than the first rack system. The height of the highest shelf from the ground may be between 5 feet and 10 feet, 15 feet and 20 feet, 20 feet and 25 feet, 30 feet and 35 feet, 35 feet and 40 feet, 40 feet and 45 feet, or 45 feet and 50 feet. A rack system may have fewer shelves because the rack system may be used for flowering phase, when the *cannabis* plant is taller than in the vegetative phase. The second rack system may be substantially collinear with the first rack system, which may facilitate movement of trays between rack systems by forklifts or other methods. What is more, system 300 may include a first plurality of nutrient mixture lines attached to first rack system 312, a second plurality of nutrient mixture lines attached to second rack system 402, and a second nutrient mixture reservoir 404. The first plurality of nutrient mixture lines may be configured to deliver the first nutrient mixture from first nutrient mixture reservoir 316 to the plurality of trays when the plurality of trays is on first rack system 312.

A plurality of shelves 406 on second rack system 402 may be configured to hold the plurality of trays. The spacing between an adjacent pair of shelves of plurality of shelves 406 may be the same as the spacing between an adjacent pair of shelves on first rack system 312.

When the plurality of trays is on plurality of shelves 406, the second plurality of nutrient lines may be configured to deliver a second nutrient mixture from second nutrient mixture reservoir 404 to the plurality of trays. The second nutrient mixture may be drained from second nutrient mixture reservoir and replaced with a flush solution 404. Either first nutrient mixture reservoir 316 or second nutrient mixture reservoir 404 may hold water instead of a nutrient mixture.

Second rack system 402 may include a second plurality of lights. The lights may be light emitting ceramics (LEC) and may exclude light-emitting diodes. The lights may produce a limited spectrum, which may be in the red wavelength range. A light 408 of second plurality of lights may be placed similarly as induction lamp 318. The light intensity or coverage may be increased by adding another light 410. Light 410 may be smaller in size than light 408 and may be placed between light 408 in another light similar in size to light 408. For example, light 408 may be between about the dimensions of induction lamp 318, while light 410 may be between about 10 inches and about 20 inches wide or between about 12 inches and about 16 inches wide. Using both light 408 and light 410 provides more light to a tray 412 of a plurality of trays and also provides more flexibility in setting light intensity. Tray 412 may be the same tray as tray 302 or any tray from the plurality of trays previously on rack system 312.

System 300 may include an air handling system. Fans or blowers may circulate air horizontally to help equilibrate temperature across a shelf. Additional fans or blowers may circulate air vertically to help equilibrate temperatures vertically. Fans or blowers may also reduce concentration gradients in the facility. For example, the carbon dioxide concentration should be at a level from 1,200 to 1,500 ppm, when ambient levels are typically around 400 ppm. Natural gas may be burned to generate carbon dioxide at these levels. Fans or blowers may provide a convective force to mix carbon dioxide in the building.

System 300 may include a reverse osmosis system to purify water mixed with the nutrient mixture. System 300 may also include a control system to control the temperature of the purified water. System 300 may also include a regeneration system for the growing medium. The growing medium may be washed and sanitized in the regeneration system before being reused.

Systems described herein may conform to applicable building and safety codes, including codes for marijuana cultivation.

EXAMPLE

Figure 5:
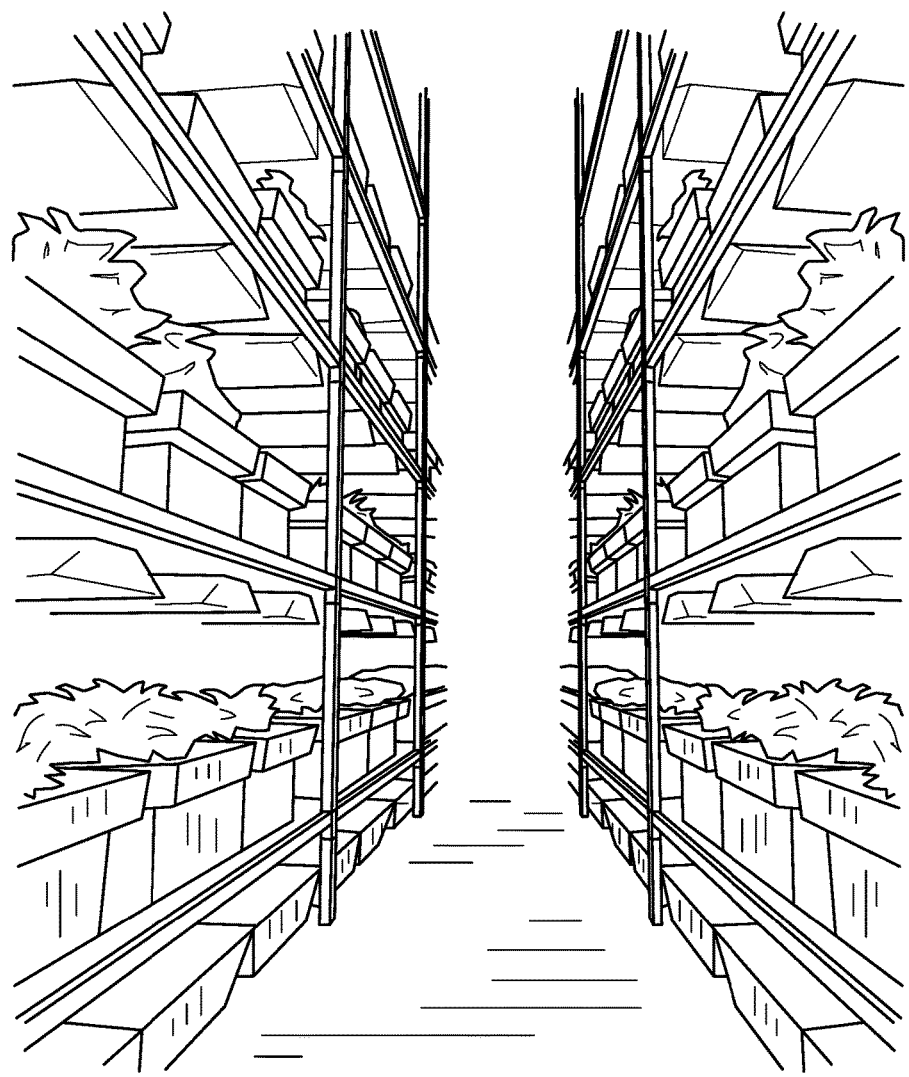
FIG. 5 shows a drawing of a rack system in vegetative growth phase according to embodiments.
Figure 6:
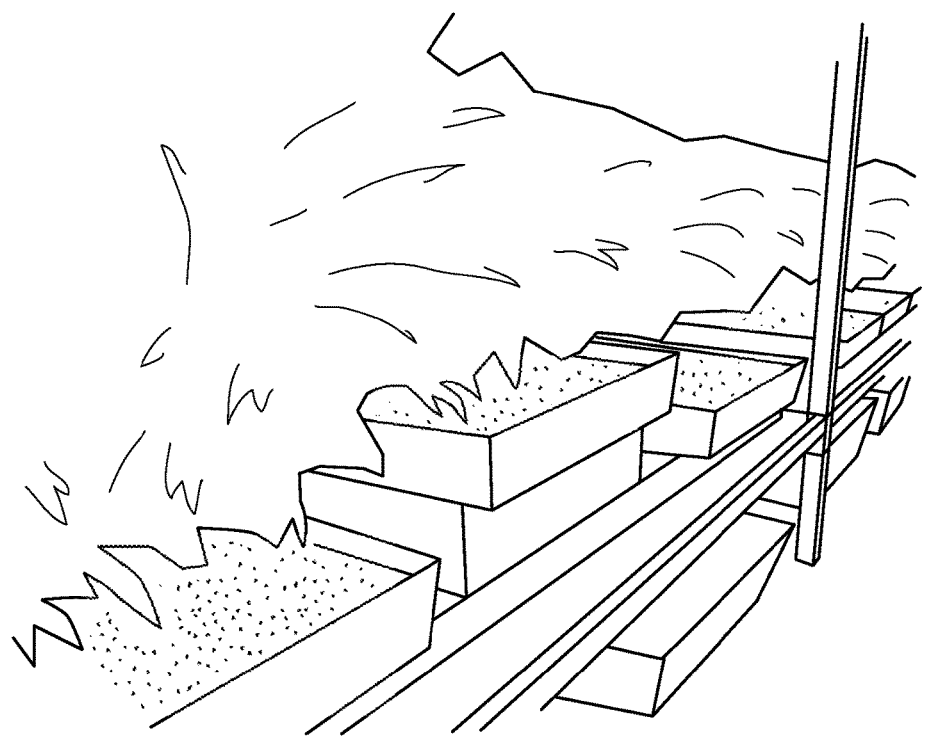
FIG. 6 shows a drawing of trays in flowering growth phase according to embodiments.

The yield of *cannabis* product produced per input power by methods described herein was measured. The process included five vertical levels of trays in the vegetative growth phase and four vertical levels of trays in the flowering growth phase. FIG. 5 shows a drawing of a rack system in vegetative growth phase. FIG. 6 shows a drawing of trays in flowering growth phase. For each set of five trays across five vertical levels in the vegetative growth phase, one pump filled and drained the trays. For each set of four trays across four vertical levels in the flowering growth phase, one pump filled and drained the trays. In addition, the process included vertical and horizontal air handling systems to minimize temperature gradients. During vegetative growth, *cannabis* plants received about 18 hours of light exposure from induction lamps. During flowering growth, the *cannabis* plants received about 12 hours of light exposure from light-emitting ceramic lamps. Natural gas was burned to maintain a level of carbon dioxide at a range from 1,200 to 1,500 ppm. Water was purified by a reverse osmosis system and controlled at a temperature of 68° F. The yield of the *cannabis* bud or flower was in a range from 1 g/W to 1.2 g/W, 30 g to 50 g per square foot, and 50 g to 120 g per plant.

The yield was compared to another process to produce *cannabis*, which included only one vertical level of vegetative growth and flowering growth. This one-level process used metal halide lamps for vegetative growth and sodium lamps for flowering growth. The yield of this one-level process was about 0.8 g/W. About 30% of the improvement over this one-level process was estimated to result from the higher efficiency lighting systems. In other words, most of the improvement in yield can be attributed to process improvements other than lighting.

This example shows that the methods described herein can provide a significantly higher yield than conventional methods.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Additionally, details of any specific embodiment may not always be present in variations of that embodiment or may be added to other embodiments.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges and also the entire range may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the plant" includes reference to one or more plants and equivalents thereof known to those skilled in the art, and so forth. "About" may indicate a precision expected by one of skill in the art, including 5% or 10%. The invention has now been described in detail for the purposes of clarity and understanding. However, it will be appreciated that certain changes and modifications may be practice within the scope of the appended claims.

What is claimed is:

1. A method of cultivating *cannabis* hydroponically, the method comprising:

placing a first *cannabis* plant of a plurality of *cannabis* plants in a first tray of a plurality of trays;

placing a second *cannabis* plant of the plurality of *cannabis* plants in a second tray of the plurality of trays, wherein:

the first tray is disposed on a first shelf of a first rack system, the second tray is disposed on a second shelf of the first rack system, the first shelf is at a first height, the second shelf is at a second height, and the first height is different from the second height;

flowing a first nutrient mixture from a first nutrient reservoir to the plurality of *cannabis* plants;

returning a portion of the first nutrient mixture to the first nutrient reservoir after flowing the first nutrient mixture to the plurality of *cannabis* plants;

exposing the plurality of *cannabis* plants to a first artificial light source having a first limited spectrum;

growing on the first rack system each *cannabis* plant of the plurality of *cannabis* plants without producing flowers;

transporting the plurality of trays from the first rack system to a second rack system;

flowing a second nutrient mixture from a second nutrient reservoir to the plurality of *cannabis* plants;

exposing the plurality of *cannabis* plants to a second artificial light source having a second limited spectrum, wherein the first limited spectrum comprises a different wavelength range than the second limited spectrum; and growing flowers on each *cannabis* plant of the plurality of *cannabis* plants on the second rack system.

* * * * *